United States Patent
Saleck

(10) Patent No.: US 8,877,322 B2
(45) Date of Patent: Nov. 4, 2014

(54) CORRUGATED WRAPPING MATERIAL

(76) Inventor: Michael J. Saleck, Bloomington, MN (US)

(*) Notice: Subject to any disclaimer, the term of this patent is extended or adjusted under 35 U.S.C. 154(b) by 503 days.

(21) Appl. No.: 13/294,233

(22) Filed: Nov. 11, 2011

(65) Prior Publication Data

US 2013/0122263 A1    May 16, 2013

(51) Int. Cl.
*B32B 3/28* (2006.01)
*B65D 65/40* (2006.01)

(52) U.S. Cl.
CPC ............ *B32B 3/28* (2013.01); *B65D 65/403* (2013.01)
USPC .......................................... 428/182; 206/521

(58) Field of Classification Search
CPC ........ B32B 3/28; B32B 29/08; D65D 65/403; B65D 65/403
USPC .......................................... 428/182; 206/521
See application file for complete search history.

(56) References Cited

U.S. PATENT DOCUMENTS

| 1,156,866 | A | * | 10/1915 | Ford | 52/452 |
| 3,741,859 | A | * | 6/1973 | Wandel | 428/114 |
| 4,132,581 | A | * | 1/1979 | Swartz | 156/208 |

* cited by examiner

*Primary Examiner* — Donald J Loney
(74) *Attorney, Agent, or Firm* — Mark A. Litman & Associates, P.A.

(57) ABSTRACT

A conformable sheet material has:
 a) a support layer having a top surface and a bottom surface;
 b) a corrugated layer adhered to the top surface of the support layer;
 c) the corrugated layer having an array of peaks extending away from the top surface of the support layer and troughs proximal to the top surface of the support layer;
 d) the corrugated layer having its array of peaks extending along a length of the support layer;
 e) an elongated element having inelastic memory; and
 f) the elongated element passing through the array of peaks and above the troughs along the length of the support layer.

20 Claims, 3 Drawing Sheets

CORRUGATED WRAPPING MATERIAL

BACKGROUND OF THE INVENTION

1. Field of the Invention

The present invention relates to the field of covering material, particularly corrugated covering materials, and most particularly corrugated covering materials that are capable of conforming to a covered shape and retaining their conformational shape by means of an imbedded wire system approximately perpendicular to the direction of the fluting and between or even approximately mid-way through the trough and peak of the wave pattern.

2. Background of the Art

Corrugated materials have numerous structural properties that enable and suggest their use in many different environments. They are able to provide both strength and insulation in packaging while providing light weight to the packaging structures such as boxes and containers. The same structural properties find use in roofing materials, fluid transport pipes and insulation between structural elements. Corrugated materials can also be used in applications relating to plant, tree, vine as well as environmental applications such as perimeter blocking to assist in reduction of ground erosion as well as wraps and protection of surfaces are also generally described herein.

SUMMARY OF THE INVENTION

A conformable sheet material has:

a) a support layer having a top surface and a bottom surface;

b) a corrugated layer adhered to the top surface of the support layer;

c) the corrugated layer having an array of peaks extending away from the top surface of the support layer and troughs proximal to the top surface of the support layer;

d) the corrugated layer having its array of peaks extending along a length of the support layer;

e) an elongated element having inelastic memory; and f) the elongated element passing through the array of peaks and above the troughs along the length of the support layer.

BRIEF DESCRIPTION OF THE FIGURES

FIGS. 1A, 2B, 3C and 4D show various corrugated shapes that can be used as a corrugated array in the present technology.

DETAILED DESCRIPTION OF THE INVENTION

A conformable sheet material has:

a) a support layer having a top surface and a bottom surface. The support layer is a structural material (e.g., reinforced fabric, solid, paper, polymer, reinforced polymer and the like. The preferred material comprises a polymer, especially a thermoplastic polymer such as a polyvinyl resin (polyvinyl halide, polyvinyl chloride and copolymers), especially a flexible poly; polyolefin resins (polyalkylene, such as polyethylene and/or polypropylene) and the like.

b) a corrugated layer adhered to the top surface of the support layer. The corrugated layer may comprise the same or different structural material as the support layer;

c) the corrugated layer having an array of peaks extending away from the top surface of the support layer and troughs proximal to the top surface of the support layer. These peaks and troughs are typical structural elements in corrugated structures. These arrays generally comprise repeated parallel peaks with intervening, equally spaced parallel troughs;

d) the corrugated layer having its array of peaks extending along a length of the support layer in this parallel order;

e) an elongated element having inelastic memory. By inelastic memory is meant that when the elongated element is bent past its elastic limit, it retains at least a significant degree (e.g., at least 15%) of the distortion beyond the elastic limit of the material. For example, when a linear metal wire having continuous diameter dimensions of between 0.25 mm and 3 mm) is bent around a 10 mm diameter mandrel, the wire will retain a conformational shape at least with a 30 mm diameter mandrel; and f) the elongated element passing through the array of peaks and above the troughs along the length of the support layer.

When the corrugated sheet material is bent (folded, shaped in conformation) along its length, with the folds corresponding to bends in the troughs, the elongated element exceeds its elastic memory and retains a portion of its inelastic bend to keep a folded shape. This retained inelastic bend keeps the corrugated sheet material in an approximately conformational alignment with any element (e.g., tree, post, plant, pole, pot, structure, etc.) about which the corrugated sheet material is wrapped and bent.

The corrugated covering materials generically described herein are capable of conforming to a covered shape and retaining their conformational shape by means of an imbedded wire system approximately perpendicular (±30 degrees from perpendicular or ±15 degrees from perpendicular) to the direction of the fluting and between (e.g., 10% below the top of the peak) or even approximately mid-way (between 35 and 65% of the distance between the bottom of the trough and the top of the peak), with the wire passing through the elevated fluting and between the trough and peak of the wave pattern.

These and other aspects of the technology will be further understood and appreciated from a review of the Figures.

Figure 1:
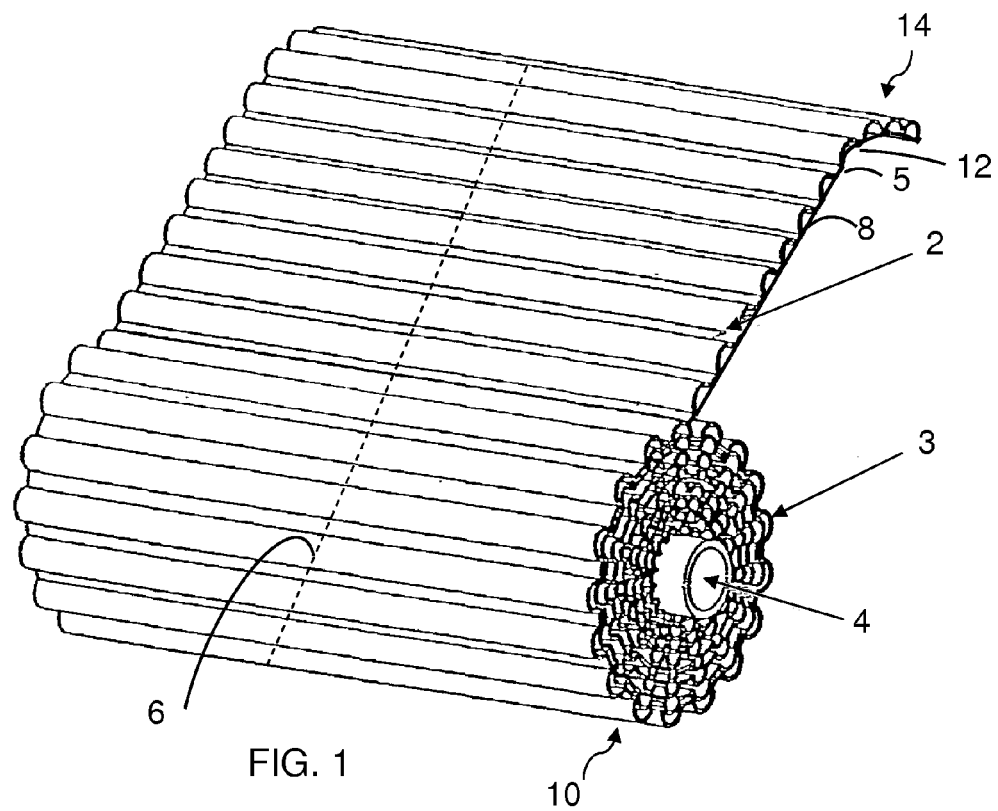
FIG. 1 shows a rolled corrugated sheet material 10 according to the present technology.
Figure 2:
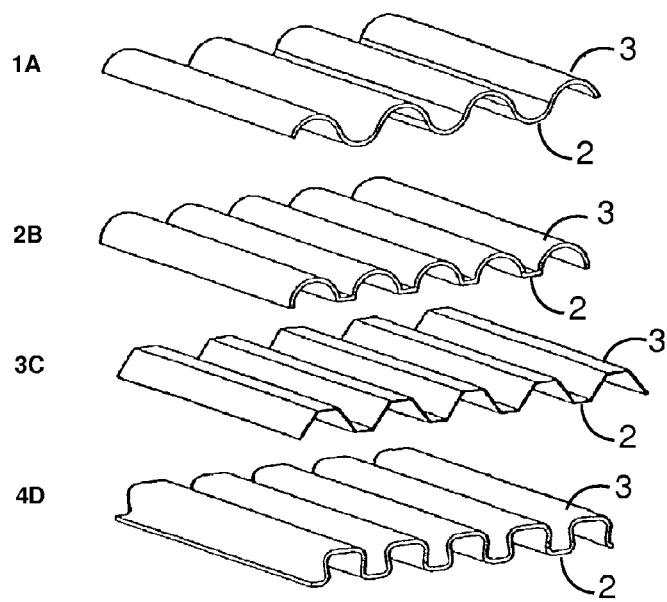

FIG. 1 shows a roll 10 of corrugated material having troughs 2 and peaks 3 and a cylindrical support roll 4. The support layer 5 is shown, as is the flexible elongated element 6 passing through the peaks 3. Where the corrugated material 10 has been bent past its elastic limit 12, curvature 14 in the corrugated material is retained in essentially inelastic memory. As the curvature 14 is bent again past its elastic memory, the curvature 14 would change and retain its new shape.

FIGS. 1A, 2B, 3C and 4D show variations in corrugation patterns with 3 representing peaks and 2 representing troughs, as in FIG. 1.

Figure 3:
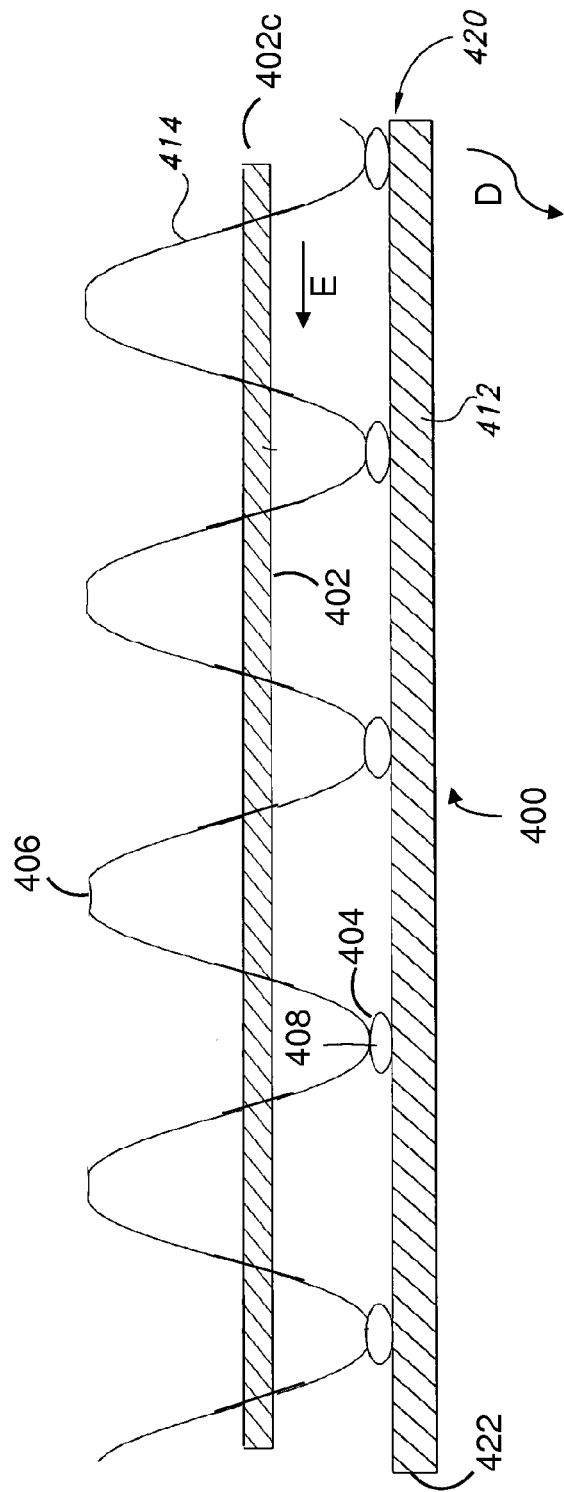
FIG. 3 shows a cross-section of a corrugated sheet material with elongated element according to one aspect of the present technology.

FIG. 3 shows a side view of a flexible corrugated sheet material 400 according to aspects of the present technology. The flexible support layer 412, end 420 of the flexible support layer 412, adhesion or bonding points 404 of the troughs 408 and the peaks 406 are shown. A single, flexible, inelastic memory providing elongate element 402 is shown passing through the corrugated material between the peaks 406 and troughs 408. As end 422 remains stable and end 420 is bent in direction D, not only will the elongated element 402 bend (and if bent far enough, exceed its elastic limit), but end 402c is likely to slide relative to the peaks 406, as in direction E, as the change in curvature of the corrugated sheet material 400 will provide longitudinal force against the flexible elongated element 402, causing it to slide as the corrugated sheet material 400 bends. This will reduce wrinkling and collapsing of peaks 406.

Figure 4:
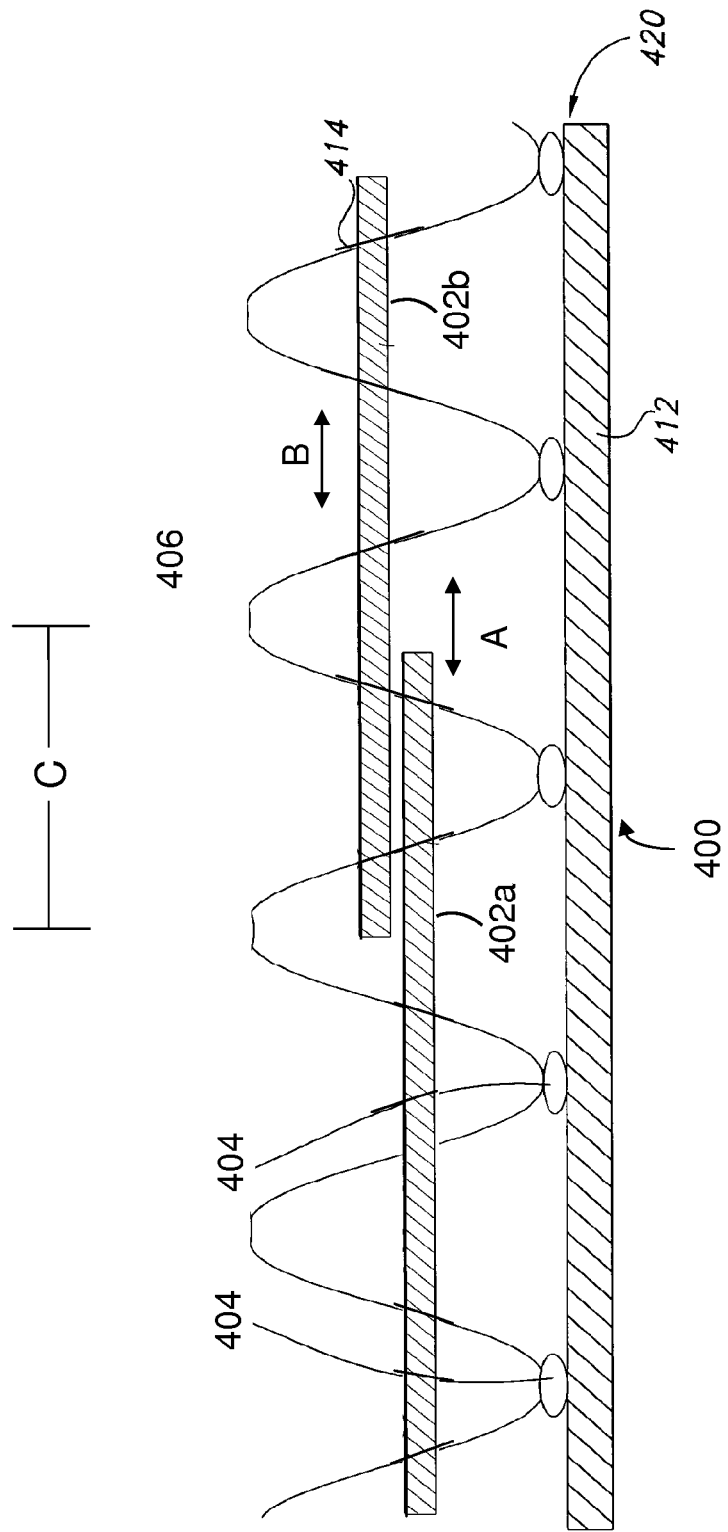
FIG. 4 shows a side view or cross-section of a corrugated sheet material with discontinuous elongated elements according to one aspect of the present technology.

FIG. 4 shows a side view side of a corrugated sheet material 400 with discontinuous elongated elements 402a 402b according to one aspect of the present technology. Like numbers in previous figures represent similar elements in FIG. 4. By having the elongated elements 402a 402b staggered with an overlap C in length, as the individual element 402a moves along the direction of line A as the corrugated sheet material 400 is bent, and as individual elongated element 402b moves along the direction of line B as the corrugated sheet material 400 is bent, sliding of the respective individual flexible elements will remain overlapping within distance C, and the retention of the bent shape is less likely to be impaired. Additionally, manufacture of the flexible corrugated sheet material may be simplified by feeding of discontinuous (e.g., finite length elements of 0.2 to 2 m) elongated flexible elements rather than continuous flexible elements into the peaks.

The wire should be any sturdy wire-like element that can retain its fold after it is bent. This fold retention is preferably a bending beyond elastic memory, without destruction of the supporting strength of the wire. For example, metals, polymer coated metals, metal coated polymers and the like can be designed to have the appropriate fold properties. Glasses and ceramics would tend to break when their elastic limits are exceeded and are not appropriate selections for the wire material. The wire may be, by way of a non-limiting example, from 0.2 mm up to 5 mm, preferably from 0.4 to 3 mm in diameter along its length. The wire may be continuous through the corrugation, or as described in greater detail herein, extend in overlapping segment of, again by way of non-limiting examples, from 10 cm to 50 cm in length, or from 10 cm to 30 cm in length.

These and other aspects of the technology described and enabled herein are encompassed by the claims. There are numerous materials, dimensions, alternatives and improvements within the skill of the ordinary artisan that may also be used within the scope of the generic technology described herein.

What is claimed:

1. A conformable sheet material comprising: a) a support layer having a top surface and a bottom surface; b) a corrugated layer adhered to the top surface of the support layer; c) the corrugated layer having an array of peaks extending away from the top surface of the support layer and troughs proximal to the top surface of the support layer; d) the corrugated layer having its array of peaks extending along a length of the support layer; e) an elongated element having inelastic memory; and f) the elongated element passing through the array of peaks and above the troughs along the length of the support layer, wherein the elongated element comprises a wire material comprising metal wherein multiple elongated elements extend along the length of the conformable sheet and overlap in length of individual elongated elements along the length of the conformable sheet.

2. A conformable sheet material comprising: a) a support layer having a top surface and a bottom surface; b) a corrugated layer adhered to the top surface of the support layer; c) the corrugated layer having an array of peaks extending away from the top surface of the support layer and troughs proximal to the top surface of the support layer; d) the corrugated layer having its array of peaks extending along a length of the support layer; e) an elongated element having inelastic memory; and f) the elongated element passing through the array of peaks and above the troughs along the length of the support layer, wherein the elongated element comprises a wire material having dead-fold properties, wherein the polymer comprises a polyolefin or polyvinyl polymer and wherein multiple elongated elements comprising metal extend along the length of the conformable sheet and overlap in length of individual elongated elements along the length of the conformable sheet.

3. The conformable sheet material of claim 1 wherein the array of peaks are a parallel array of peaks.

4. The conformable sheet material of claim 3 wherein the array of peaks is a sinusoidal array of peaks.

5. The conformable sheet of claim 1 wherein the multiple elongated elements comprise a wire material having dead-fold properties.

6. The conformable sheet of claim 1 wherein the corrugated material comprises an organic material.

7. The conformable sheet of claim 1 wherein the corrugated material comprises a polymeric material.

8. The conformable sheet of claim 7 wherein the multiple elongated elements comprise a wire material having dead-fold properties.

9. The conformable sheet of claim 1 wherein the polymer comprises an ethylenically unsaturated polymer.

10. The conformable sheet of claim 7 wherein the polymer comprises a polyolefin or polyvinyl polymer.

11. The conformable sheet of claim 10 wherein the elongated element comprises a wire material having dead-fold properties.

12. The conformable sheet material of claim 2 wherein the array of peaks are a parallel array of peaks.

13. The conformable sheet material of claim 12 wherein the array of peaks is a sinusoidal array of peaks.

14. The conformable sheet of claim 2 wherein the elongated element comprises a wire material having dead-fold properties.

15. The conformable sheet of claim 2 wherein the corrugated material comprises an organic material.

16. The conformable sheet of claim 2 wherein the corrugated material comprises a polymeric material.

17. The conformable sheet of claim 2 wherein the multiple elongated elements comprise a wire material having dead-fold properties.

18. The conformable sheet of claim 15 wherein the polymer comprises an ethylenically unsaturated polymer.

19. The conformable sheet of claim 16 wherein the polymer comprises a polyolefin or polyvinyl polymer.

20. The conformable sheet of claim 19 wherein the elongated element comprises a wire material having dead-fold properties.

* * * * *